United States Patent

Ingram

[15] 3,656,345

[45] Apr. 18, 1972

[54] AUTOMATIC FREE-FALL OCEANOGRAPHIC TEMPERATURE PROBE

[72] Inventor: Carey Ingram, 3634 Oleander Drive, San Diego, Calif. 92106

[22] Filed: Oct. 23, 1970

[21] Appl. No.: 83,570

[52] U.S. Cl. ........................................... 73/170 R, 73/343 R
[51] Int. Cl. ........................................................... G01w 1/00
[58] Field of Search ...................... 73/170 A, 343, 344; 9/8

[56] References Cited

UNITED STATES PATENTS 3,372,585  3/1968  Niskin .................................... 73/170
3,473,383  10/1969  Dubach .................................. 73/343

Primary Examiner—Richard C. Queisser
Assistant Examiner—Herbert Goldstein
Attorney—R. S. Sciascia, George J. Rubens and J. W. McLaren

[57] ABSTRACT

An oceanographic temperature probe which can be jettisoned from vessels at sea for free-fall descent to a desired water depth on the ocean floor. After a predetermined lapse of time a float is released from a disposable stand which causes the operation of a reversing thermometer and its return to the surface with the float for recovery.

10 Claims, 4 Drawing Figures

INVENTOR.
CAREY INGRAM 3,656,345

PATENTED APR 18 1972

INVENTOR.
CAREY INGRAM

BY George J. Rubens

AUTOMATIC FREE-FALL OCEANOGRAPHIC TEMPERATURE PROBE

STATEMENT OF GOVERNMENT INTEREST

The invention described herein may be manufactured and used by and for the Government of the United States of America for governmental purposes without the payment of any royalties thereon or therefor.

BACKGROUND OF THE INVENTION

This invention relates to sampling instruments, and more particularly to such an instrument employing a reversing type thermometer for recording ocean floor temperatures. It is the current practice in oceanographic research to obtain ocean bottom temperatures by using hydrographic winches and cables to lower and raise the temperature probe to and from the ocean floor. In addition to this time-consuming procedure, which requires as much as 4 and 5 hours on station in deep waters, it is often difficult to position and orient the sampling instrument within the prescribed limits off the bottom, i.e., 6 to 10 feet.

SUMMARY OF THE INVENTION

The probe utilizes a conventional reversing type thermometer for recording bottom temperatures. The thermometer is supported within a protective frame which is rotatably and releasably connected to a disposable, hydrodynamically balanced stand. If needed the stand may be provided with a ballast pedestal for maintaining the thermometer in a substantially upright position on the ocean floor. A buoyant means, such as a glass float, is detachably mounted to the top of the stand and serves two functions, namely to assist in maintaining hydrodynamic balance, and also to provide the means for reversing and returning the thermometer package to the ocean surface for recovery. After lapse of a predetermined period of time to accomplish the sampling task, as determined by a time-delay mechanism, the float is released. Through a tether line from the float, the thermometer frame is inverted and freed from the housing for ascent with the float to the surface. The ballasted stand is expendable and discarded on the ocean floor.

OBJECTS OF THE INVENTION

A principal object of this invention is to provide an improved and simplified means by which the temperature of ocean bottom waters may be determined from vessels at sea in an expeditious manner.

Another important object is to provide a temperature probe which can be dropped into the ocean from a vessel in a free-fall condition for descent to the ocean floor and be recovered at the ocean surface without the need for a physical connection from the vessel.

Other objects, advantages and novel features of the invention will become apparent from the following detailed description of the invention when considered in conjunction with the accompanying drawings.

DESCRIPTION OF THE PREFERRED EMBODIMENT

Figure 1:
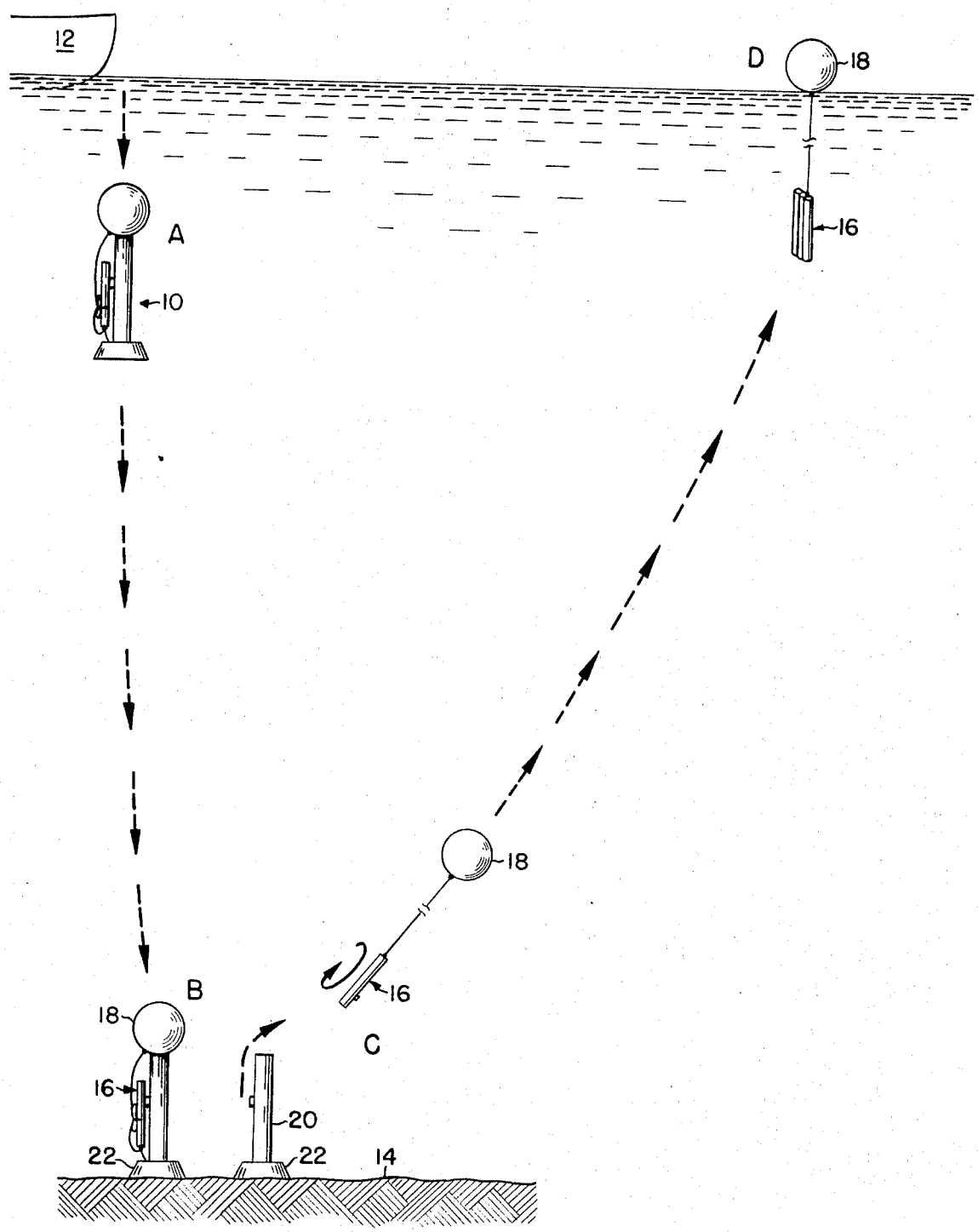
FIG. 1 is a diagrammatic elevation view of the path of the temperature probe showing significant positions during its descent and ascent from the time it is dropped into the body of water to its recovery position at the water surface.

Referring to the drawings where like reference numerals refer to similar parts throughout the figures, there is shown in FIG. 1, the novel temperature probe 10 shown in four principal operational positions, A, B, C, and D during its deployment. At position A, probe 10 has been dropped overboard from a suitable platform, such as a vessel 12, and is descending freely toward the ocean floor 14. At position B, probe 10 is shown resting in a substantially vertical position on the ocean floor with a thermometer package 16 at a predetermined height above the bottom. After a predetermined lapse of time during which the thermometers reach in situ temperature, the thermometers are reversed and the device lifted free of the probe 10 by a float or other buoyant device 18 as illustrated in position C. The float and thermometer package 16 rise to the ocean surface, shown in position D, where they can be readily recovered.

Figure 2:
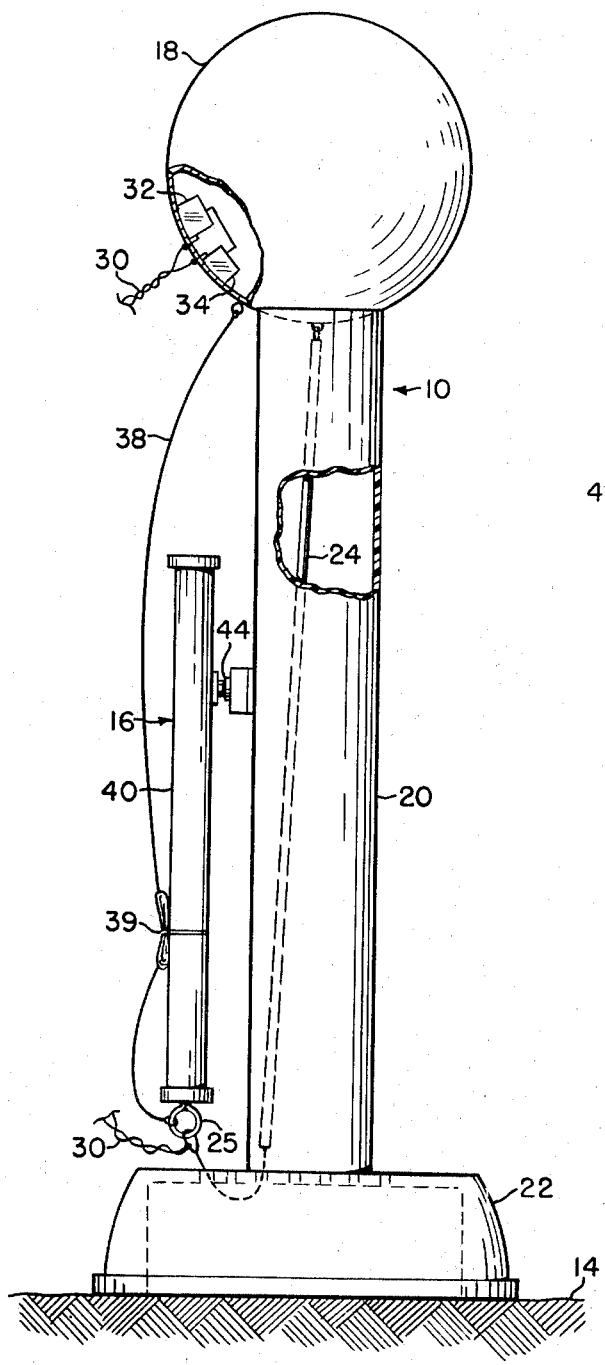
FIG. 2 is an enlarged side elevation view of the assembled temperature probe.

FIG. 2 shows the temperature probe 10 in detail as it appears at position B, wherein 20 represents a support stand, which preferably comprises a vertical hollow tubular member made of plastic material or the like. Stand 20 is hydrodynamically balanced to support reversing thermometer package 16 in a substantially vertical orientation on the ocean floor 14 in order to record the ocean bottom temperature at a predetermined height above the ocean floor. One technique that may be employed for maintaining the stand in an upright position is to provide it with a ballast pedestal 22. A used brake drum has been found adequate to serve this purpose, the stand being suitably secured thereto by brackets or the like.

Float 18 is preferably a glass sphere which is seated in the upper open end of tubular stand 20. The float serves two functions; firstly, being a minus weight at the upper end of the stand it provides upright stability of the probe, and, secondly, it serves as a flotation means when released to reverse and to return the thermometer package 16 to the surface after accomplishing its task of recording the bottom temperatures.

Float 18 is releasably secured on the upper end of stand 20 by a retaining cord 24 which is preferably resilient, such as a bungee cord. An upper end of retaining cord 24 is secured to the float, and a lower end secured to an eye 25 mounted to the bottom end of the thermometer package 16 via a wire portion 26 which is threaded through the existing bolt holes in pedestal 22. Retaining cord 24 is installed in a stretched or "cocked" condition so as to apply a tension to maintain float 18 securely on stand 20, as well as constraining thermometer package in position on the stand as will be hereinafter described.

Figure 3:
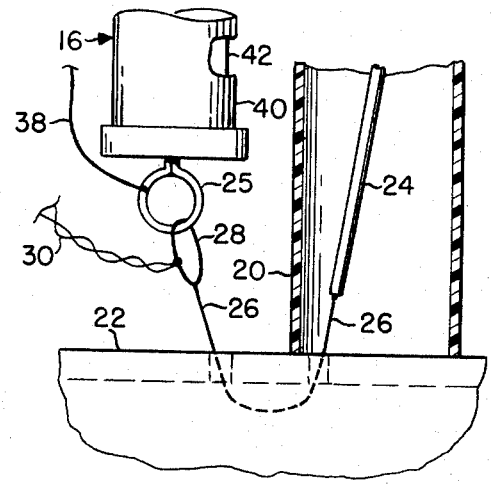
FIG. 3 is a further enlarged lower end view of the thermometer frame showing the means for securing the frame to the retaining cord via the triggering device.

As best illustrated in FIG. 3 wire portion 26 of the retaining cord is connected to eye 25 through a fusible wire link 28 which serves as a triggering device to initiate release of float 18 after a predetermined time has expired during which time the in situ temperature of the water has been obtained. Fusible wire link 28 is connected by wires 30 to a circuit which includes a DC battery 32 and a time-delay continuity switch 34, both components being of conventional design. Time-delay switch 34 is preset to connect battery 32 across fuse link 28 to part the link and release float 18. Both battery 32 and time-delay switch 34 conveniently can be mounted within float 18 where they are sealed from the water environment and are recoverable with the float.

Float 18 is also connected by a tether line 38 to ring 25 on the bottom of thermometer package 16 to affect its release as will be presently described. An excess supply of the tether line is bunched together at 39 and secured to the thermometer package by a rubber band or the like which is readily parted by float 18 when released.

As shown in FIG. 3, thermometer package 16 comprises a frame 40 fabricated to house three thermometers 42, two of which are protected type reversing thermometers and one an unprotected type reversing thermometer. The thermometer package is commercially available and enables an accurate determination of the thermometric depth at which the temperature readings were obtained. As is well known in the art a reversing thermometer is constructed so that when reversed the mercury is trapped to record the in situ temperature for reference when read at the time of recovery. The reversing thermometers must be oriented substantially in an upright position prior to reversal to obtain an accurate reading of the bottom temperature, and the invention probe is designed to maintain such an orientation. The specific arrangement of the thermometer package 16 is of no significance and other arrangements of the reversing thermometers can be utilized without departing from the spirit of the invention.

Figure 4:
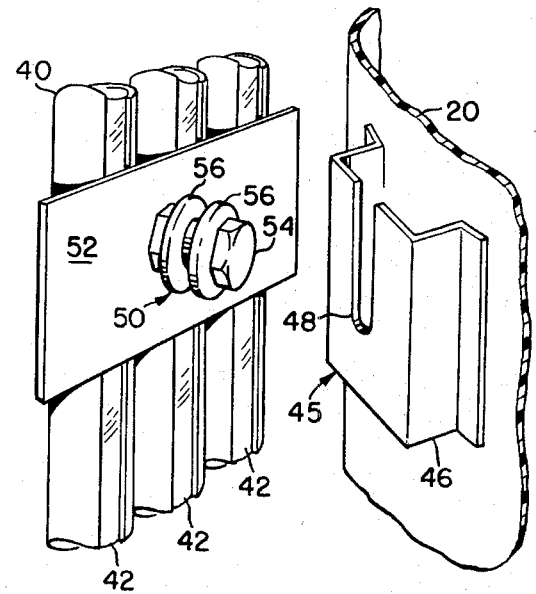
FIG. 4 is an enlarged partial perspective view of the slidable release latch mechanism for the thermometer package with the respective parts of the latch in a separated position to show the details.

Reversal of thermometer frame 40 and the thermometers 42 supported therein is accomplished in a simple manner by a reversing latch 44, (FIG. 2). As shown in FIG. 4, the latch comprises a female portion 45 comprising a U-shaped bracket 46 having its leg portions mounted to stand 20. The face of the bracket is spaced from stand 20 and has formed thereon a vertical slot 48 open only at the upper end. Slot 48 is adapted slidably to receive a male member 50 secured to a plate 52 mounted on the back of thermometer frame 40.

Male member 50 comprises essentially a bolt 54 threadably mounted to plate 52 and on which is secured spaced washers 56. With stand 20 in a vertical orientation and the latch 44 assembled, bolt 54 slidably rests on the bottom of slot 48 with washers 56 engaging both sides of the bracket to laterally support the thermometer package. Bolt 54 rests loosely in slot 48 so that the reversing thermometer package can be rotated and easily unlatched from stand 20 by the released float as described under the heading OPERATION. Latch 44 is preferably positioned at a position on thermometer frame 40 at a point above the center of gravity to insure stability while suspended on the stand prior to reversal. The length of support stand 20 and the location of reversing latch 44 thereon is selected so that the in situ temperature will be obtained at the preselected height off the ocean floor.

In lieu of using the electrical triggering circuit described above to effect release float 18, fusible wire link 28 can be replaced with a link member made of any suitable soluble material having a fixed rate of dissolution to provide the required time delay. For example, a conventional candy lifesaver has been employed successfully, as well as magnesium links and other dissolvable materials.

OPERATION

The operation of the invention temperature probe is briefly described with reference to FIG. 1. The assembled probe 10 is dropped freely in the water from vessel 12 or any other platform. The probe descends through the water in an upright position, generally shown in position A, due to the minus weight on top through float 18 and the plus weight due to the stand 20 and pedestal 22. When the probe reaches the ocean floor, position B, it remains substantially upright in a hydrodynamically balanced condition despite variations in the contour of the ocean floor, which as previously described, is necessary in order that reversing thermometers function properly.

After a lapse of a predetermined time, depending on the depth of water and other considerations, as set in time-delay switch 34, or by selection of a suitable soluble connector 28, retaining cord 24 is disconnected to release float 18 and relieve the tension on the bottom of thermometer frame 40. The float being free from stand 20 commences to ascend and applies a tension on tether line 38 connected to the bottom of thermometer frame 40. A turning movement is created on thermometer frame 40 which is now free to rotate around latch 50. The thermometer frame is inverted and the thermometers contained therein record the in situ temperatures. As separation of retaining cord 24 has released the tension on the thermometer frame, the upward thrust by float 18 on tether line pulls bolt 54 free of slot 48 to effect unlatching and separation of the thermometer frame from the stand. Float 18 and thermometer frame 40 ascend upwardly for recovery at the surface. Stand 20 and ballast 22 being expendable remain discarded on the ocean floor.

The temperature probe of this invention provides a simple and expedient means for recording ocean bottom temperatures. The probe has no physical connection with the launching vessel and when deployed will accomplish the designed task and return to the ocean surface for recovery. The sampling instrument is supported in a stable manner at a predetermined height above the ocean floor assuring accurate measurements and reliable readings.

Obviously many modifications and variations of the present invention are possible in the light of the above teachings. It is therefore to be understood that within the scope of the appended claims the invention may be practiced otherwise than as specifically described.

What is claimed is:

1. A free-fall oceanographic temperature probe comprising:
   a vertical stand;
   a frame rotatably and releasably mounted to the stand and housing at least one reversing thermometer, said frame and thermometer initially oriented so that the thermometer records the temperature of its surroundings and upon reversal provides a permanent record of the temperature at the time of reversal;
   buoyant means mounted on the stand for maintaining the stand in a substantially upright position;
   a tether line connecting the buoyant means to the thermometer frame so that release of the buoyant means causes the frame to be rotated and released;
   means for detaching said buoyant means from said frame after lapse of a predetermined period of time;
   whereby release of the buoyant means will cause said frame and thermometer to reverse, recording the in situ temperature, and be released from the stand for travel to the surface with the buoyant means for recovery.

2. The probe of claim 1 wherein said tether line is connected to the thermometer frame at a lower end.

3. The probe of claim 2 wherein said detaching means includes a tension member for securing the buoyant means on the stand.

4. The probe of claim 3 wherein said thermometer frame is connected to the stand by a sliding latch means which enables the frame to be rotated and released by tension applied by the buoyant means on said tether line.

5. The probe of claim 4 wherein said tension member applies a force to secure the buoyant means on the stand and to secure the thermometer frame within the sliding latch, said tension member being fastened at one end to the buoyant means and the other end to the thermometer frame.

6. The probe of claim 3 wherein said detaching means includes a dissolvable triggering device.

7. The probe of claim 6 wherein said triggering device is water soluble.

8. The probe of claim 6 wherein said triggering device is electrically actuated through a time-delay circuit.

9. The probe of claim 8 where said time-delay mechanism and an electric power source is sealably housed within said buoyant means.

10. The probe of claim 2 wherein a pedestal ballast is provided at the base of said stand for maintaining said housing in a substantially vertical attitude.

* * * * *